United States Patent [19]

Lew

[11] Patent Number: 4,680,090

[45] Date of Patent: Jul. 14, 1987

[54] DIRECT HEAT RECYCLING REGENERATIVE STILL

[76] Inventor: Hyok S. Lew, 7890 Oak St., Arvada, Colo. 80005

[21] Appl. No.: 721,655

[22] Filed: Apr. 10, 1985

Related U.S. Application Data

[63] Continuation-in-part of Ser. No. 492,445, May 6, 1983, and Ser. No. 647,365, Sep. 4, 1984, abandoned.

[51] Int. Cl.$^4$ .......................... B01D 1/06; B01D 1/28
[52] U.S. Cl. .................................... 202/187; 202/177; 202/205; 202/233; 202/234; 202/235; 202/237; 126/435; 126/442; 203/22; 203/26; 203/DIG. 1
[58] Field of Search ............... 202/177, 187, 237, 180, 202/234, 205, 235, 233; 203/26, 100, DIG. 1, 22, 99, 91, 10, 11; 159/903, 24.2, 27.4, 28.5; 126/435, 442; 196/110, 134

[56] References Cited

U.S. PATENT DOCUMENTS

| | | | |
|---|---|---|---|
| 1,966,938 | 7/1934 | Stone | 203/11 |
| 2,339,862 | 1/1944 | Kleinschmidt | 202/182 |
| 2,490,659 | 12/1949 | Snyder | 203/DIG. 1 |
| 3,284,318 | 11/1966 | Coanda et al. | 203/26 |
| 3,461,041 | 8/1969 | Snyder | 203/26 |
| 3,540,986 | 11/1970 | Guarino | 202/187 |
| 3,575,814 | 4/1971 | Bahrenburg | 203/26 |
| 3,616,270 | 10/1971 | Ferrara | 203/47 |
| 3,822,192 | 7/1974 | Brown | 202/187 |

Primary Examiner—Wilbur Bascomb

[57] ABSTRACT

This invention relates to a distillation device that employs a plurality of twin tubings of coaxial arrangement or of side-by-side arrangement wherein the vaporization takes place at an evacuated state in one tubing and the condensation takes place in the other tubing of the twin tubings. A blower or pump moves the vapor from the vaporization tubing to the condensation tubing and, consequently, creates an evacuated state in the vaporization tubing and a pressurized state in the condensation tubing. As the condensation takes place at a higher pressure in the condensation tubing compared with the vaporization in the vaporization tubing, the temperature of the condensation tubing is higher than the temperature of the vaporization tubing, and consequently, a very high percentage of the latent heat released by the condensing vapor is recycled from the condensation tubing to the vaporization tubing by conduction through the metallic wall dividing the condensation tubing from the vaporization tubing.

23 Claims, 13 Drawing Figures

DIRECT HEAT RECYCLING REGENERATIVE STILL

This is a continuation-in-part application to patent application Ser. No. 492,445 entitled "Partially evacuated Solar Still" filed on May 6, 1983 and to patent application Ser. No. 647,365 entitled "Evacuated evaporation-pressurized condensation solar still" filed on Sept. 4, 1984 and now abandoned.

BACKGROUND OF THE INVENTION

There has been an ever-increasing demand for an energy-efficient distillation device for obtaining purified distilled liquid from contaminated liquid or for separating the liquid and solid from a mixture thereof as such a device has wide applications in the water purification industry, toxic waste processing and other industries employing distillation process. In order to be an extremely energy-efficient device, firstly, the distillation device must operate at a temperature low enough to absorb the thermal energy from industrial waste heat, solar radiation, river or sea water, atmospheric air, etc. and, secondly, it must recycle the thermal energy at a very high regeneration ratio. The first requirement can be satisfied by operating a still wherein the evaporation takes place at an evacuated state whereby the liquid boils at a temperature significantly lower than the temperature at which heat transfer takes place from the thermal energy source to the still. The second requirement can be satisfied by condensing the vapor at a pressurized state in one of two parallel twin tubings wherein the evaporation takes place in the other tubing of the twin tubing whereby the latent heat released at a higher temperature in a pressurized condensation is directly recycled by heat conduction to promote the evacuated evaporation taking place at a lower temperature. It is well known that, once an evacuated state is established, it does not require any power to maintain the evacuated state. Consequently, a low pressure high volume blower or pump forcibly moving the vapor from the evaporation tubing of the twin tubing to the condensation tubing of the twin tubing is all that is required to construct a revolutionary new still that operates of a not-so-high-/temperature thermal energy source and recycles the thermal energy involved in the evaporation-condensation process taking place therein.

The primary object of the present invention is to provide a distillation device that directly recycles the latent heat released by the condensing vapor to promote a further evaporation of raw fluid.

Another object is to provide a distillation device with twin tubings wherein the evaporation of the raw fluid takes place at an evacuated state in one tubing in the twin tubing and a condensation takes place at a pressurized state in the other tubing.

A further object is to provide a distillation device employing a low pressure-high volume blower or pump that forcibly moves the vapor from the evaporator tubings to the condenser tubing, which establishes an evacuated state in the evaporator tubing and a pressurized state in the condenser tubing.

Yet another object is to provide a distillation device that produces distilled water from sea water by using thermal energy extracted from the ambient sea water and recycling thereof.

Yet a further object is to provide a distillation device that operates on not-so-high temperature energy sources such as industrial waste heat, solar energy, etc.

These and other objects of the present invention will become clear as the description thereof proceeds.

BRIEF DESCRIPTION OF THE FIGURES

The present invention may be described with clarity and specificity by referring to the following figures.

DESCRIPTION OF THE ILLUSTRATED EMBODIMENT

Figure 1:
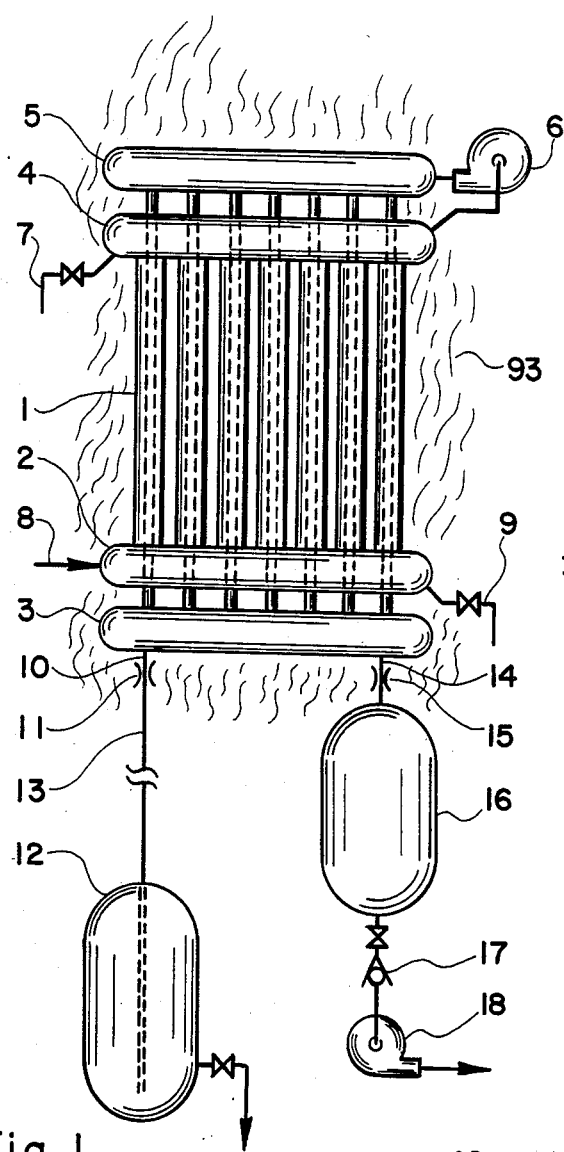
FIG. 1 illustrates an embodiment of the present invention that draws thermal energy from the industrial waste heat, sea water, etc. and recycling thereof.
Figures 3, 4, 5:
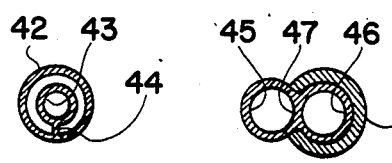
FIG. 3 illustrates an embodiment of the twin tubing employed in the present invention.
FIG. 4 illustrates another embodiment of the twin tubing employed in the present invention.
FIG. 5 illustrates a cross section of a further embodiment of twin tubing employed in the present invention.

In FIG. 1, there is illustrated an embodiment of the present invention that comprises a plurality of twin tubings 1 disposed intermediate the liquid header tubes 2 and 3, and the vapor header tubes 4 and 5. As illustrated in FIG. 3 each of the twin tubings 1 comprises an evaporation tubing of a large diameter and a condensation tubing of a small diameter coaxially disposed within the evaporation tubings. The raw liquid header tubing 2 and the vapor collector header tubing 4 are connected to one another by the evaporator tubings, while the condenser tubings routed through the raw liquid header tubing 2 and the vapor collector header tubing 4 connects the distilled liquid header tubing 3 to the vapor distributor header tubing 5. A low pressure-high volume blower or pump moves the vapor from the vapor collector head tubing 4 to the vapor distributor header tubing 5. The vapor collector header tubing 4 includes a purge port or over-flow port. The raw liquid header tubing 2 includes a raw liquid inlet port 8 and a purge port 9 respectively disposed at two opposite extremities of the raw liquid header tubing 2. The distilled liquid header tubing 3 includes an outlet 10 equipped with an orifice 11 that discharges the distilled liquid into a reservoir 12 through a gravity vacuum leg tubing 13, or an outlet 14 with an orifice 15 that discharges the distilled liquid directly into a reservoir 16 equipped with a check valve 17 and a pump 18. The direct heat recycling regenerative still shown in FIG. 1 operates in the following principles: The grid-work of the twin tubings 1 are in contact with the fluid medium 93 that transfers heat to the evaporation tubing of the twin tubings, which medium may be waste steam or hot water discharged from a power plant or other industrial facility or sea water. The raw liquid supplied through the inlet 8 of the header tubing 2 fills the annular spaces in the twin tubings intermediate the evaporator tubings and the condenser tubing to a level that leaves a vapor space in the upper half of the vapor collector header tubing 4. The vapor in the vapor collector header tubing 4 is forcibly moved into the vapor distributor header tubing 5 by the low pressure-high volume blower or pump 6 that creates an evacuated state in the evaporator tubings and a pressurized state in the condenser tubings of the twin tubings 1. The vapor condenses in the condenser tubings due to the compression provided by the blower or pump 6 and release the latent heat at a temperature slightly higher than the boiling temperature at an evacuated state in the evaporator tubings. As a consequence, the latent heat released at a higher temperature in the condenser tubings is absorbed by the raw fluid in the evaporator tubings boiling at a lower temperature due to the evacuated state thereof. The distilled liquid produced by the condensing vapor in the condenser tubings of the twin tubings 1 accumulates in the distilled liquid header tubing 3 and drains into the reservoir tanks 12 or 16 through outlets 10 or 14 equipped with orifices 11 or 15. Any excess amount of the raw fluid may be discharged through the over-flow port 7 which may be connected to a gravity vacuum leg tubing. The residual raw fluid may be intermittently or continuously discharged through the purge port 9. The operating pressure of the direct heat recycling regenerative still shown in FIG. 1 is determined by the temperature of the heating fluid medium moving through the grid work of the twin tubings. The pressure in the evaporator tubings has to be low enough to make the raw fluid to boil at the temperature to which the raw fluid in the evaporator tubings of the twin tubings 1 is heated by the heating fluid medium. If the temperature of the heating fluid medium is sufficiently high to heat the raw fluid in the evaporator tubings to the boiling temperature at standard atmospheric pressure, the direct heat recycling regenerative still may be operated at the atmospheric pressure wherein the blower or pump 6 creates a slightly evacuated state in the evaporator tubings and a slightly pressurized state in the condenser tubings and consequently, the distilled liquid reservoir 12 or 16 should be operated at the atmospheric pressure. If the temperature of the heating medium is low, the pressure in the evaporator tubings has to be evacuated to make the raw fluid boil at the temperature compatible with the temperature of the heating medium. In order to minimize the power consumed by the blower or pump 6, the pressure in the condenser tubings has to be maintained at a few psi higher than the pressure in the evaporator tubings. Therefore, the reservoir tanks 12 or 16 have to be operated at an evacuated state, which can be maintained by a gravity vacuum leg tubing 13 in case of the reservoir 12 or a pump 18 in case of the reservoir 16. The direct heat recycling regenerative still of the present invention provides two advantages which are, firstly, all of the thermal energy transfered to the still from the heating medium is recycled at an extremely high recycling efficiency rate as the latent heat released by the condensing vapor in the condenser tubing has no place to go other than the raw fluid in the evaporator tubing that surrounds the condenser tubing and, secondly, a low temperature heat source such as sea water can be employed as the heating medium in distilling the sea water into the pure water when the still is operated at an evacuated state sizably lower than the atmospheric pressure. The operation of the direct heat recycling regenerative still of the present invention at a partial vacuum requires only a slightly larger energy consumption compared with one at atmospheric pressure.

Figure 2:
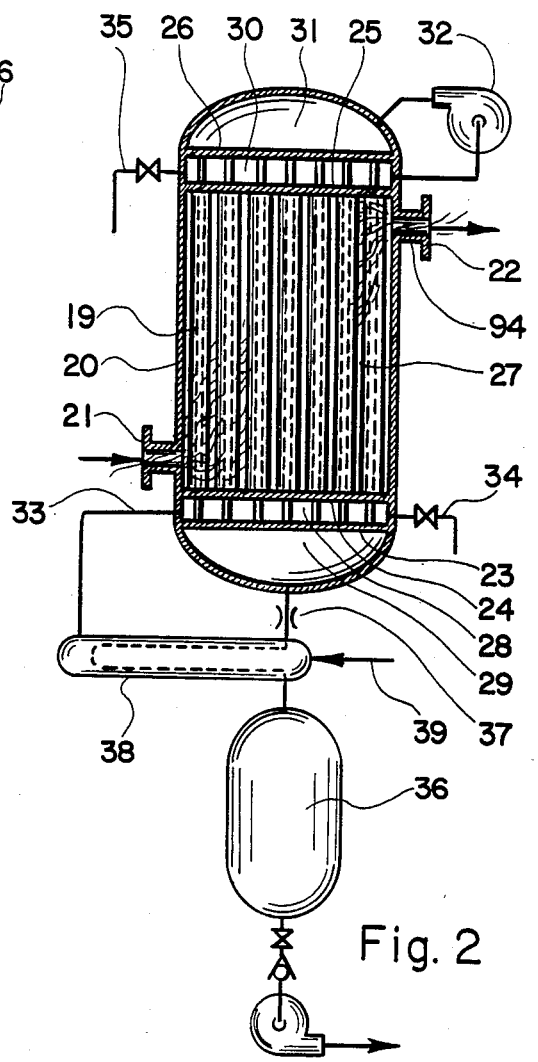
FIG. 2 illustrates another embodiment of the present invention that is packaged in a self-contained heat exchanger module.

In FIG. 2 there is illustrated another embodiment of the present invention that operates essentially in the same principles as the embodiment shown in FIG. 1. The twin tubings 19 comprising the evaporator tubings and the condenser tubings arranged in a coaxial relationship are packaged in a heat exchanger vessel 20 through which the heating fluid medium 94, that enters through an entry port 21 and leaves through a discharge port 22, is circulated. The heat exchanger vessel 20 is divided into five different compartments by four partitioning plates 23, 24, 25 and 26. The heating medium is circulated through the large central compartment that houses the plurality of the twin tubings 19. The raw fluid compartment 28 intermediate the central compartment 27 and the distilled fluid compartment 29 is connected to the vapor collector compartment 30 intermediate the central compartment 27 and the vapor distributor compartment 31 by the plurality of the evaporator tubings which are the outer tubings of the twin tubings 19. The distilled fluid compartment 29 and the vapor distributor compartment 31 are connected to one another by the plurality of the condensor tubings which are the inner tubings of the twin tubings 19, which condenser tubings are routed through the raw fluid compartment 28 and the vapor collector compartment 30. The blower or pump 32 forcibly moves the vapor from the vapor collector compartment 30 to the vapor distributor compartment 31. The raw fluid compartment 28 includes a raw fluid inlet port 33 and a residual raw fluid purge port 34. The vapor collector compartment 30 includes an over-flow port 35. The distilled fluid accumulated in the distilled fluid compartment 29 empties into a reservoir 36 through an outlet orifice 37. The raw fluid heater 38 may be employed to preheat the raw fluid supplied to the raw fluid compartment 28 wherein the raw fluid entering the preheater 38 through the inlet 39 is heated by the distilled fluid flowing through tubings routed through the preheater 38. Of course, the direct heat recycling regenerative still shown in FIG. 2 as well as that of FIG. 1 may operate with or without a preheater.

In FIG. 3 there is illustrated a cross section of an embodiment of the twin tubing that comprises an outer evaporator tubing 40 and an inner condenser tubing 41 arranged in a coaxial relationship.

In FIG. 4 there is illustrated a cross section of another embodiment of the twin tubings comprising an outer evaporator tubing 42 and an inner condenser tubing 43 which are connected to one another by one or more radially disposed webs 44.

In FIG. 5 there is illustrated a cross section of a further embodiment of the twin tubing comprising an evaporator tubing 45 and a condenser tubing 46 arranged in a side-by-side arrangement and divided from one another by a common wall 47. The portion of the wall of the condenser tubing 46 exposed to the heating medium is insulated by an insulating material 48 that prevents the loss of the latent heat released in the condenser tubing 46 to the heating medium and, consequently, enhances direct heat recycling from the condenser tubing 46 to the evaporator tubing 45 through heat conduction across the partitioning wall 47. It is self-evident that the coaxial twin tubings employed in the embodiments shown in FIGS. 1 and 2 can be easily replaced with the side-by-side twin tubings shown in FIG. 5. There are many other embodiments available for the construction of a twin tubing that enhances a direct heat recycling, which embodiments are considered a matter of design that may be employed in the practice of the present invention.

Figure 6:
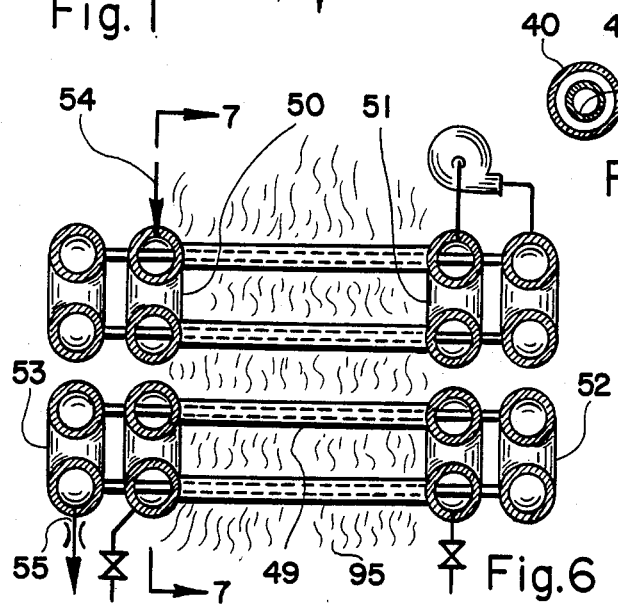
FIG. 6 illustrates an embodiment of the present invention designed for a horizontal installation.

In FIG. 6 there is illustrated a cross section of an embodiment of the present invention that comprises the plurality of the twin tubings 49 disposed horizontally in an assembly essentially the same as that of FIG. 1 including the vertically disposed twin tubings. Each of the raw water header tubings 50, vapor collector header tubings 51, the vapor distributor header tubings 52 and the distilled fluid header tubings 53 comprises a plurality of inter-connected horizontal tubings. The raw fluid is fed into the top-most raw fluid header tubing through the raw fluid inlet 54 while the distilled fluid is collected from the bottom-most distilled fluid header tubing through the distilled fluid outlet orifice 55. The twin tubings 49 are heated by a heating fluid medium 95.

Figure 7:
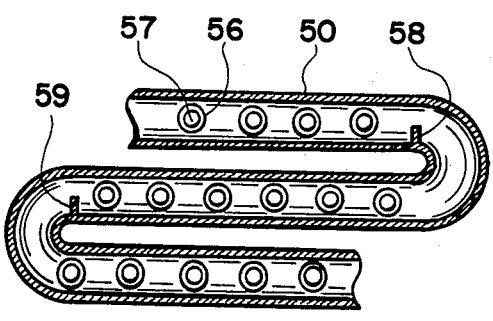
FIG. 7 illustrates a cross section of the device shown in FIG. 6.

In FIG. 7 there is shown a cross section of the raw fluid header tubing assembly taken along plane 7—7 as shown in FIG. 6. The plurality of the evaporator tubings 56 terminate at the raw fluid header tubings 50, while the condenser tubings 57 extends through the raw fluid header tubings 50. Each horizontal segment of the raw fluid header tubings include over flow weirs 58, 59, etc., which ensure the even distribution of the raw fluid to all twin tubings while the raw fluid trickles down the raw fluid header tubings 57. The vapor collector header tubings 51 may be provided with weirs as shown in FIG. 7.

Figure 8:
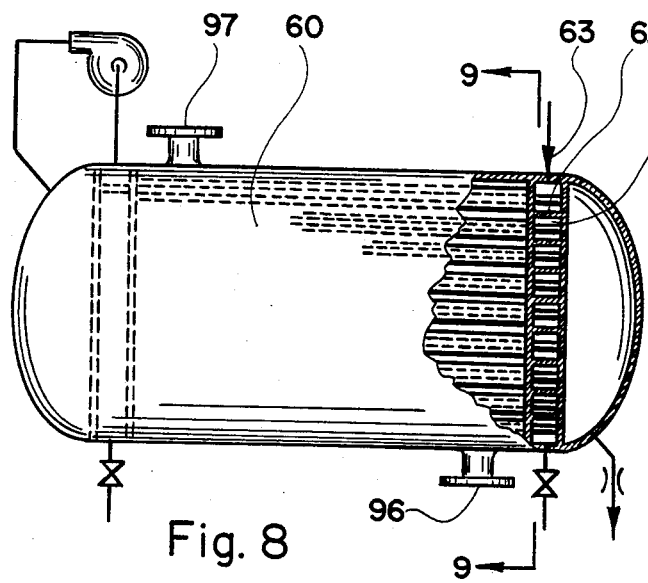
FIG. 8 illustrates another embodiment of the present invention designed for a horizontal installation.

In FIG. 8 there is shown an elevation view of a heat exchanger vessel 60 disposed horizontally, that has essentially the same construction as the corresponding element installed vertically in the embodiment shown in FIG. 2 with an exception being that the raw fluid distributor compartment 61 includes a plurality of horizontal partitions 62 equipped with over-flow weirs, which ensure the even distribution of the raw fluid to all twin tubings as the raw fluid fed through the inlet 63 located at the top of the raw fluid distributor compartment 61 trickles down over those partitions with weirs.

The heating fluid circulated through the heat exchanger vessel 60 enters through an inlet 96 and leaves through an outlet 97.

Figure 9:
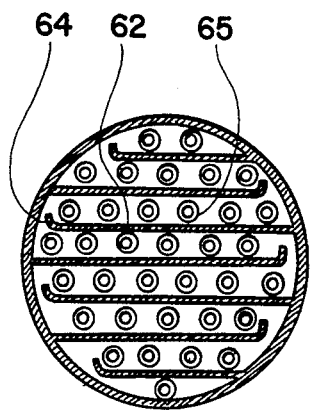
FIG. 9 illustrates a cross section of the device shown in FIG. 8.

In FIG. 9 there is illustrated a cross section of the heat exchanger vessel 60 taken along plane 9—9 as shown in FIG. 8, wherein the plurality of the partitioning bars with weirs 64 are clearly illustrated. The vapor collector compartment to which the raw fluid distributor compartment is connected by the plurality of the twin tubings 65 may be provided with a plurality of partitioning bars with over-flow weirs as shown in FIG. 9.

Figures 10, 11:
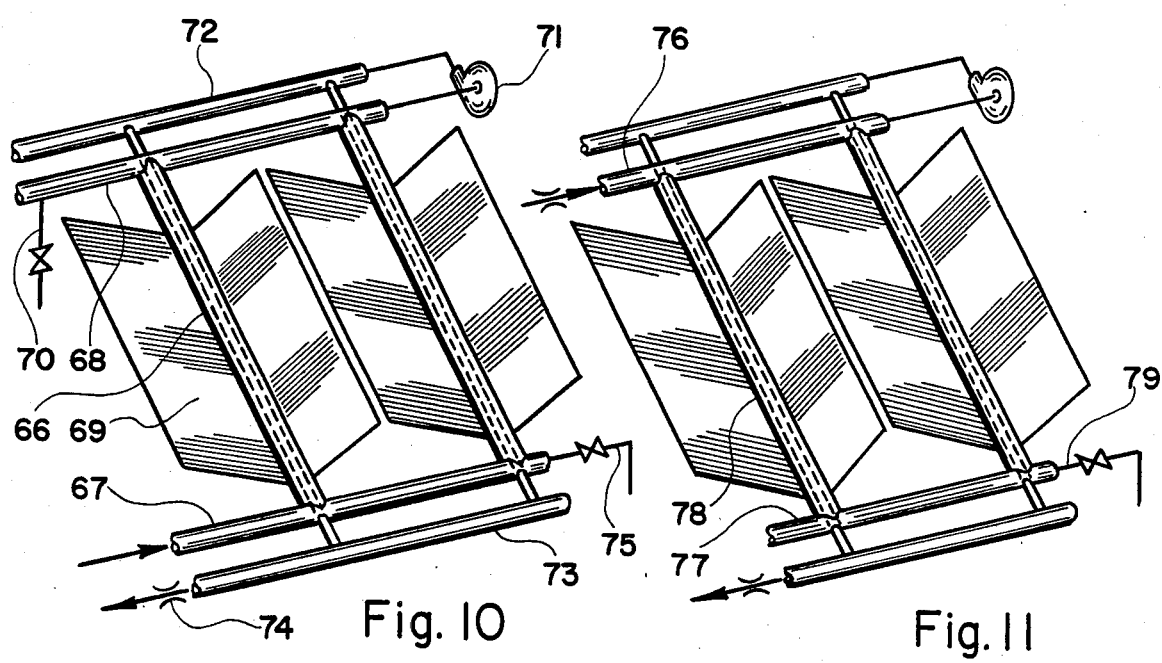
FIG. 10 illustrates an embodiment of the present invention operating on a solar collector.
FIG. 11 illustrates another embodiment of the present invention operating on a solar collector.

In FIG. 10 there is illustrated a perspective view of an embodiment of the present invention employing solar collectors. Each of the twin tubings 66 connecting the raw fluid distributor header tubing 67 and the vapor collector header tubing 68 is heated by a solar collector panel 69. The raw fluid distributed to the evaporator tubings connecting the raw fluid distributor header tubing 67 and the vapor collector header tubing 68 is supplied through the raw fluid distributor header tubing 67 disposed at a lower elevation than the vapor collector header tubing 68 wherein the level of the raw fluid is kept from filling the vapor collector header tubing 68 by controlling the raw fluid supply to the raw fluid distributor header tubing 67 or by using the over-flow port 70 installed at the bottom of the vapor collector header tubing 68. The low pressure-high volume blower or pump 71 forcibly moves the vapor from the vapor collector header tubing 68 to the vapor distributor header tubing 72 that is connected to the distilled fluid header tubing 73 by a plurality of the condenser tubings included in the twin tubings 66. The distilled fluid is discharged from the distilled fluid header tubing 73 through an outlet orifice 74. The residual raw fluid is purged from the raw fluid header tubing 67 through a purge port 75. The operating principles of the solar powered direct heat recycling regenerative still is the same as that described in conjunction with FIG. 1.

In FIG. 11 there is illustrated a perspective view of another embodiment of the present invention that operates on solar energy, which embodiment has essentially the same construction as that shown in FIG. 10 with one exception being that the raw fluid is fed into the vapor collector header tubing located at a higher elevation than the raw fluid discharge header tubing 77 that collects the residual raw fluid trickled down through the evaporator tubings included in the twin tubings 78 and discharges through a purge port 79 that may be connected to a gravity vacuum leg pipe.

Figure 12:
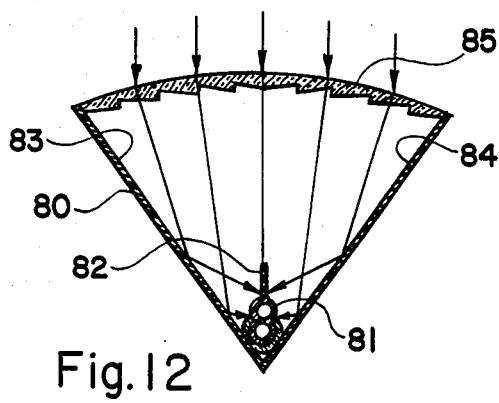
FIG. 12 illustrates a cross section of a side-by-side twin tubing heated by a solar trap.

In FIG. 12 there is illustrated a cross section of a combination including a solar trap 80 and a side-by-side twin tubing 81 equipped with a heat absorbing fin 82 extending from the evaporator tubing. The solar trap 80 comprises a pair of light reflecting surfaces 83 and 84 arranged in a trough of a V-shaped cross section wherein the top opening is covered with a two dimensional Fresnel lens. The side-by-side twin tubing 81 has the same construction as shown in FIG. 5 plus the heat absorbing fin extending from the evaporator tubing of the twin tubing 81, that divides the wedge angle of the solar trap into two substantially equal halves. The sun light falling on the Fresnel lense cover 85 is funneled toward the apex zone of the trough and absorbed by the heat absorbing fin 82 and the evaporator tubing of the twin tubing 81 under the process of repeated irradiation on the heat absorbing fin.

Figure 13:
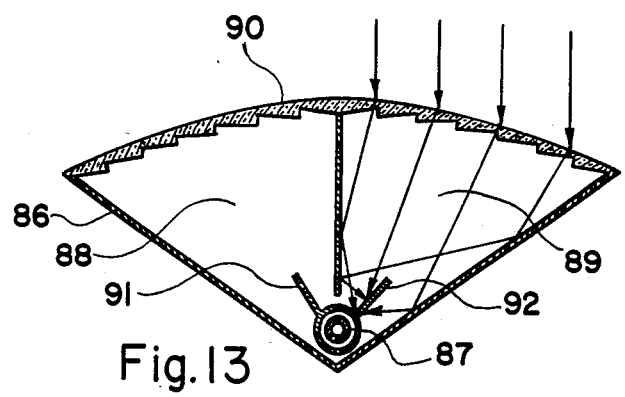
FIG. 13 illustrates a cross section of a coaxial twin tubing heated by a solar trap.

In FIG. 13 there is illustrated a cross section of another combination including a solar trap 86 and a coaxial twin tubing 87. The solar trap 86 comprises multiple light funneling troughs 88, 89, etc. covered with a two dimensional Fresnel lense 90. The coaxial twin tubing includes an outer evaporator tubing including a plurality of heat absorbing fins 91, 92, etc., each of which fins divides the wedge angle of each light funneling trough, and an inner condenser tubing coaxially disposed within the evaporator tubing. Of course, a flat collector conductively supplying the thermal energy to the wall of the evaporator tubings may be employed in place of the solar traps.

While the principles of the present invention have now been made clear by the illustrative embodiments, it will be obvious to those skilled in the art many modifications in the structures, arrangements, proportions, elements and materials which are particularly adapted to the specific working environments and operating conditions in the prctice of the invention without departing from those principles.

I claim:

1. A distillation device comprising in combination:
   (a) at least one raw fluid distributor header including at least one raw fluid inlet port;
   (b) at least one distilled fluid collector header including at least one distilled fluid outlet port;
   (c) at least one vapor collector header;
   (d) at least one vapor distributor header;
   (e) a plurality of twin tubings, each of said twin tubings comprising at least one evaporator tubing and at least one condenser tubing arranged in a parallel configuration wherein said twin tubing includes means for enhancing a conductive heat transfer between said evaporator tubing and said condenser tubing, wherein a plurality of said evaporator tubings included in said plurality of twin tubings connect said raw fluid distributor header and said vapor collector header to one another, and a plurality of said condenser tubings included in said plurality of twin tubings connect said distilled fluid collector header and said vapor distributor header to one another; and
   (f) at least one fluid moving means connecting said vapor collector header to said vapor distributor header for forcibly moving vapor from said vapor collector header to said vapor distributor header; whereby, raw fluid supplied to said plurality of evaporator tubings through said raw fluid distributor header and heated by thermal energy supplied to said plurality of twin tubings evaporates into vapor whereupon said vapor forcibly moved by said fluid moving means from said vapor collector header to said vapor distributor header condenses in said plurality of condenser tubings wherein condensate fluid is collected through said distilled fluid collector header and the latent heat released by the condensing vapor is directly transfered to said plurality of evaporator tubings.

2. The combination as set forth in claim 1 wherein said plurality of twin tubings are disposed in a substantially vertical direction.

3. The combination as set forth in claim 2 wherein said distilled fluid outlet port included in said distilled fluid collector header include means for discharging distilled fluid out of said distilled fluid collector header while maintaining an evacuated state in said plurality of condenser tubings.

4. The combination as set forth in claim 2 wherein said condenser tubing is disposed within said evaporator tubing in a substantially coaxial relationship in the construction of said twin tubing.

5. The combination as set forth in claim 2 wherein said condenser tubing and said evaporator tubing are disposed in a side-by-side relationship sharing a common wall in the construction of said twin tubing.

6. The combination as set forth in claim 2 wherein said plurality of twin tubings are enclosed within a vessel including at least one heating medium inlet and at least one heating medium outlet.

7. The combination as set forth in claim 6 wherein said distilled fluid outlet port included in said distilled fluid collector header includes means for discharging distilled fluid out of said distilled fluid collector header while maintaining an evacuated state in said plurality of condenser tubings.

8. The combination as set forth in claim 6 wherein said condenser tubing is disposed within said evaporator tubing in a substantially coaxial relationship in the construction of said twin tubing.

9. The combination as set forth in claim 6 wherein said condenser tubing and said evaporator tubing are disposed in a side-by-side relationship sharing a common wall in the construction of said twin tubing.

10. The combination as set forth in claim 1 wherein said plurality of twin tubings are disposed in substantially horizontal direction and said raw fluid distributor header includes means for distributing the raw fluid to said plurality of evaporator tubings without filling up said raw fluid distritutor header.

11. The combination as set forth in claim 10 wherein said distilled fluid outlet port included in said distilled fluid collector header includes means for discharging distilled fluid out of said distilled fluid collector header while maintaining an evacuated state in said plurality of condenser tubings.

12. The combination as set forth in claim 10 wherein said condenser tubing is disposed within said evaporator tubing in a substantially coaxial relationship in the construction of said twin tubing.

13. The combination as set forth in claim 10 wherein said condenser tubing and said evaporator tubing are disposed in a side-by-side relationship sharing a common wall in the construction of said twin tubing.

14. The combination as set forth in claim 10 wherein said plurality of twin tubings are enclosed within a vessel including at least one heating medium inlet and at least one heating medium outlet.

15. The combination as set forth in claim 14 wherein said distilled fluid outlet port inlcuded in said distilled fluid collector header includes means for discharging distilled fluid out of said distilled fluid collector header while maintaining an evacuated state in said plurality of condenser tubings.

16. The combination as set forth in claim 14 wherein said condenser tubing is disposed within said evaporator tubing in a substantially coaxial relationship in the construction of said twin tubing.

17. The combination as set forth in claim 14 wherein said condenser tubing and said evaporator tubing are disposed in a side-by-side relationship sharing a common wall in the construction of said twin tubing.

18. The combination as set forth in claim 1 wherein said combination includes a solar energy collector comprising means for directing the sunlight to said plurality of evaporator tubings.

19. The combination as set forth in claim 18 wherein said distilled fluid outlet port included in said distilled fluid collector header includes means for discharging distilled fluid out of said distilled fluid collector header while maintaining an evacuated state in said plurality of condenser tubings.

20. A distillation device comprising in combination:
   (a) at least one raw fluid distributor-vapor collector header including at least one raw fluid inlet port;
   (b) at least one residual raw fluid collector header including at least one residual raw fluid purge port;
   (c) at least one vapor distributor header;
   (d) at least one distilled fluid collector header including at least one distilled fluid outlet port;
   (e) a plurality of twin tubings, each of said twin tubings comprising at least one evaporator tubing and at least one condenser tubing arranged in a parallel configuration wherein said twin tubing includes means for enhancing a conductive heat transfer between said evaporator tubing and said condenser tubing wherein a plurality of said evaporator tubings included in said plurality of twin tubings connect said raw fluid distributor-vapor collector header and said residual raw fluid collector header to one another, and a plurality of said condenser tubings included in said plurality of twin tubings connect said vapor distributor header to said distilled fluid collector header to one another; and (f) at least one fluid moving means connecting said raw fluid distributor-vapor collector header to said vapor distributor header for forcibly moving vapor from said raw fluid distributor-vapor collector header to said vapor distributor header;

whereby, raw fluid supplied to said plurality of evaporator tubings through the bottom of said raw fluid distributor-vapor collector header and heated by thermal energy supplied to said plurality of twin tubings evaporates into vapor whereupon said vapor forcibly moved by said fluid moving means from said raw fluid distributor-vapor collector header to said vapor distributor header condenses in said plurality of condenser tubings wherein condensate fluid is collected through said distilled fluid collector header and the latent heat released by the condensing vapor is directly transferred to said plurality of evaporator tubings.

21. The combination as set forth in claim 20 wherein said distilled fluid outlet port included in said distilled fluid collector header includes means for discharging distilled fluid out of said distilled fluid collector header while maintaining an evacuated state in said plurality of condenser tubings.

22. The combination as set forth in claim 2 wherein said combination includes a solar energy collector comprising means for directing the sunlight to said plurality of evaporator tubings.

23. The combination as set forth in claim 22 wherein said distilled fluid outlet port included in said distilled fluid collector header includes means for discharging distilled fluid out of said distilled fluid collector header while maintaining an evacuated state in said plurality of condenser tubings.

* * * * *